US010063079B2

(12) United States Patent
Lei et al.

(10) Patent No.: US 10,063,079 B2
(45) Date of Patent: Aug. 28, 2018

(54) METHOD AND DEVICE FOR CHARGING BATTERIES IN MOBILE DEVICES

(71) Applicant: Xiaomi Inc., Beijing (CN)

(72) Inventors: Zhenfei Lei, Beijing (CN); Wei Sun, Beijing (CN); Xiangdong Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 28 days.

(21) Appl. No.: 15/212,852

(22) Filed: Jul. 18, 2016

(65) Prior Publication Data

US 2017/0033582 A1 Feb. 2, 2017

(30) Foreign Application Priority Data

Jul. 27, 2015 (CN) .......................... 2015 1 0446546

(51) Int. Cl.
*H02J 7/00* (2006.01)
*H01M 10/44* (2006.01)

(52) U.S. Cl.
CPC ........... *H02J 7/0054* (2013.01); *H01M 10/44* (2013.01); *H02J 7/007* (2013.01); *H02J 7/0081* (2013.01);
(Continued)

(58) Field of Classification Search
CPC ........ H02J 7/0054; H02J 7/007; H02J 7/0081; H01M 10/44; Y02B 40/90
(Continued)

(56) References Cited

U.S. PATENT DOCUMENTS

2008/0197813 A1* 8/2008 Asakura ................ H01M 10/05
320/150
2012/0019193 A1* 1/2012 Yu ........................... G06F 1/266
320/103
(Continued)

FOREIGN PATENT DOCUMENTS

CN 101252212 A 8/2008
CN 103296717 A 9/2013
(Continued)

OTHER PUBLICATIONS

International Search Report dated Mar. 23, 2016 for PCT Application No. PCT/CN2015/098957 (11 pp.).
(Continued)

*Primary Examiner* — Nathaniel Pelton
*Assistant Examiner* — Johali Torres Ruiz
(74) *Attorney, Agent, or Firm* — Brinks, Gilson & Lione

(57) ABSTRACT

Methods and devices are disclosed for efficient power charging of a battery in one electronic device by another electronic device. In one embodiment, a method may include establishing an electrical connection between a first electronic device and a second electronic device; acquiring, by the second electronic device via the electrical connection, real-time charging voltage information of a battery in the first electronic device, wherein the real-time charging voltage information varies with a charge state of the battery in the first electronic device; and controlling by the second electronic device, during charging of the battery in the first electronic device by the second electronic device, an output voltage of the second electronic device to charge the battery of the first electronic device according to the real-time charging voltage information.

10 Claims, 8 Drawing Sheets

(52) U.S. Cl.
CPC ....... *H02J 2007/0096* (2013.01); *Y02B 40/90* (2013.01)

(58) Field of Classification Search
USPC .......................................................... 320/103
See application file for complete search history.

(56) References Cited

U.S. PATENT DOCUMENTS

| | | | |
|---|---|---|---|
| 2012/0146576 | A1 | 6/2012 | Partovi |
| 2013/0221905 | A1 | 8/2013 | Holloway et al. |
| 2015/0162758 | A1* | 6/2015 | Dong .................... H02J 7/0021 320/112 |
| 2016/0378155 | A1* | 12/2016 | Inha ...................... G06F 1/3287 710/313 |

FOREIGN PATENT DOCUMENTS

| | | |
|---|---|---|
| CN | 103701182 A | 4/2014 |
| CN | 103762690 A | 4/2014 |
| CN | 103762702 A | 4/2014 |
| CN | 103928947 A | 7/2014 |
| CN | 104135053 A | 11/2014 |
| CN | 104467116 A | 3/2015 |
| CN | 104485724 A | 4/2015 |
| CN | 104659881 A | 5/2015 |
| CN | 104701918 A | 6/2015 |
| EP | 2 579 423 A1 | 4/2013 |
| EP | 2 701 268 A1 | 2/2014 |
| EP | 2 725 682 A1 | 4/2014 |
| RU | 2 400 904 C1 | 9/2010 |
| WO | WO 2011/156768 A2 | 12/2011 |

OTHER PUBLICATIONS

Office Action dated Jun. 13, 2017 for Russian Application No. 2016110908/07, 16 pages.
Extended European Search Report dated Jan. 30, 2017 for European Application No. 16180426.5, 10 pages.
Office Action dated Oct. 24, 2017 for Japanese Application No. 2017-530398, 4 pages.

* cited by examiner

METHOD AND DEVICE FOR CHARGING BATTERIES IN MOBILE DEVICES

CROSS-REFERENCE TO RELATED APPLICATION

This application claims priority to Chinese Patent Application No. 201510446546.4, filed Jul. 27, 2015, which is incorporated herein by reference in its entirety.

TECHNICAL FIELD

The present disclosure generally relates to the field of electronic device technology, and more particularly, to battery charging technology for portable electronic devices.

BACKGROUND

Portable electronic devices such as mobile phones and tablet computers have become indispensable. Rechargeable batteries such as lithium ion batteries are an essential part of mobile electronic devices. Consequently, technologies for efficient, fast, and safe charging of batteries are of critical importance. A battery in a mobile device may be charged by a dedicated charger connecting the mobile device to an outlet or a battery pack. In some situations, it may be desirable to charge the battery of a first electronic device by a second electronic device. Typically, the second electronic device would convert the output of its battery through its power management module to a fixed voltage and supply the fixed voltage to the first electronic device. The first electronic device would monitor and acquire in real-time a required safe charging voltage according to the charge state of its battery and convert through its power management module the fixed voltage supplied by the second electronic device to the required charging voltage. Thus, there would be two voltage conversions, one by the first electronic device and the other by the second electronic device. Power lost accompanies each of these two voltage conversions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for power charging between two electronic devices is disclosed. The method includes: establishing an electrical connection between a first electronic device and a second electronic device; acquiring, by the second electronic device via the electrical connection, real-time charging voltage information of a battery in the first electronic device, wherein the real-time charging voltage information varies with a charge state of the battery in the first electronic device; and controlling by the second electronic device, during charging of the battery in the first electronic device by the second electronic device, an output voltage of the second electronic device to charge the battery of the first electronic device according to the real-time charging voltage information.

In another embodiment, a method for power charging is disclosed. The method includes: establishing an electrical connection between a first electronic device and a second electronic device; detecting by the first electronic device in real-time charge state of a battery in the first electronic device and determining by the first electronic device real-time charging voltage information of the battery in the first electronic device while the first electronic device is being charged by the second electronic device, wherein the real-time charging voltage information varies with a the charge state of the battery in the first electronic device; and communicating in real-time via the electrical connection the real-time charging voltage information of the battery in the first electronic device to the second electronic device, causing the second electronic device to control an output voltage delivered from the second electronic device to charge the battery in the first electronic device via the electrical connection.

In another embodiment, an electronic apparatus disclosed. The electronic apparatus comprises: a processor; a memory for storing instructions executable by the processor; and an electrical interface; wherein the processor is configured to: establish an electrical connection with a first electronic device via the electrical interface, acquire via the electrical connection real-time charging voltage information of a battery in the first electronic device, wherein the real-time charging voltage information varies with a charge state of the battery in the first electronic device, and control, during charging of the battery of the first electronic device, the electronic apparatus to produce an output voltage to charge the battery of the first electronic device according to the real-time charging voltage information In another embodiment, a first electronic device is disclosed. The electronic device comprises: a processor; a memory for storing instructions executable by the processor; an electrical interface; and a battery connected to the electrical interface and the processor; wherein the processor is configured to: establish an electrical connection with a second electronic device via the electrical interface, detect in real-time charge state of the battery and determining real-time charging voltage information of the battery while being charged by the second electronic device via the electrical connection, wherein the real-time charging voltage information varies with a the charge state of electronic device, and communicate in real-time via the electrical connection the real-time charging voltage information of the battery to the second electronic device, causing the second electronic device to control an output voltage delivered from the second electronic device to charge the battery.

In another embodiment, a non-transitory computer-readable storage medium having stored therein instructions is disclosed. When executed by a processor of a second electronic device, the instructions cause the second electronic device to: establish an electrical connection between a first electronic device and the second electronic device; acquire, by the second electronic device via the electrical connection, real-time charging voltage information of a battery in the first electronic device, wherein the real-time charging voltage information varies with a charge state of the battery in the first electronic device; and control by the second electronic device, during charging of the battery in the first electronic device by the second electronic device, an output voltage of the second electronic device to charge the battery in the first electronic device according to the real-time charging voltage information.

In yet another embodiment, a non-transitory computer-readable storage medium having stored therein instructions is disclosed. The instructions, when executed by a processor of a first electronic device, cause the first electronic device to: establish an electrical connection between the first electronic device and a second electronic device; detect by the first electronic device in real-time charge state of a battery in the first electronic device and determining by the first electronic device real-time charging voltage information of the battery in the first electronic device while the first electronic device is being charged by the second electronic device, wherein the real-time charging voltage information varies with a the charge state of the battery in the first electronic device; and communicate in real-time via the electrical connection the real-time charging voltage information of the battery in the first electronic device to the second electronic device, causing the second electronic device to control an output voltage delivered from the second electronic device to charge the battery of the first electronic device via the electrical connection

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

Figure 1:
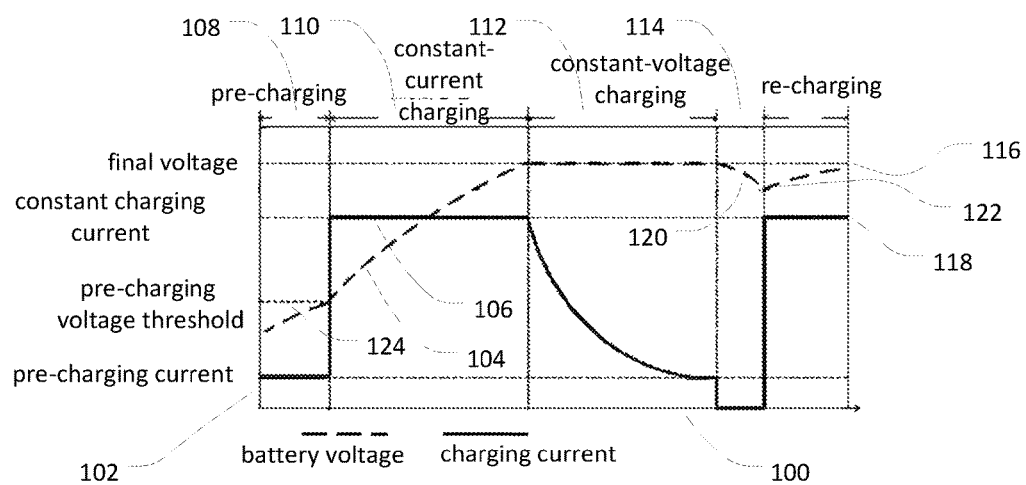
FIG. 1 is a schematic diagram illustrating various parameters as a function of time during various charging stages of a battery.

By way of introduction, general phases of power charging for a battery, e.g., a lithium ion battery, are illustrated by FIG. 1. Specifically, FIG. 1 is a chart illustrating time dependence of various parameters during a safe power charging for a battery. The various parameters include battery voltage and charging current. In FIG. 1, the horizontal axis 100 denotes time, and the vertical axis 102 denotes varying values of the various parameters during charging. The dashes line 104 represents time-dependent battery voltage, while the solid line 106 represents time dependent charging current. In order to improve efficiently of the charging while keeping the battery from damaging, charging for a battery generally may be divided into four stages: trickle charging stage 108 (i.e. pre-charging with low voltage), constant-current charging stage 110, constant-voltage charging stage 112, and charging termination stage 114.

Trickle charging in stage 108 is performed to pre-charge a completely or almost completely discharged battery with a small current to protect the battery. Trickle charging may be employed when battery voltage is lower than a pre-charging voltage threshold 124. The current for trickle charging generally is one-tenth of a specified current value, i.e. 0.1C, where "C" represents current by reference to a nominal capacity of a battery. For example, for a battery having a nominal capacity of 1000 mAh, 1 C denotes a charging current of 1000 mA. Accordingly, 0.1 C of the trickle charging represents 100 mA for this particular battery. The stage of trickle charging is optional in that the battery may not need trickle charging if it is not deeply depleted and have a battery voltage over the pre-charging voltage threshold.

Constant-current charging stage 110 is performed with a higher current when the battery voltage rises above the pre-charging voltage threshold 124. The constant current 118 of the constant-current charging stage generally is within a range from 0.2 C to 1.0 C. During the procedure of constant-current charging, the effective internal resistance of the battery in the charging circuit increases gradually. Because charging current equals charging voltage divided by the effective internal resistance, the charging voltage should be adjusted in real-time during stage 110 (gradually increasing, as shown by the curve 104 during stage 110) in order to ensure a constant charging current. Constant-current charge stage 110 ends when the voltage reaches a preset final voltage value 116.

Constant-voltage charging stage 112 starts when the battery voltage reaches the preset final voltage value 116. For a lithium ion battery, the final voltage generally is between 3.0V to 4.2V. During the constant-voltage charging stage 112, charging voltage should be maintained at the final voltage 116. The effective internal resistance of the battery in the charger circuit increases continuously during the constant-voltage charging stage 112. Consequently, the charging current decreases gradually from a constant current value 118 because charging current is in inverse proportion to the effective internal resistance. When charging current decreases to 0.01 C, the stage of constant-voltage charging ends.

The charging terminates in stage 114 after the end of constant-voltage charging. During that time, the battery may discharge slowly, leading to a drop of battery voltage, as shown by the portion 120 of the voltage curve 104. In some cases, particularly if the device and the battery are still plugged in, charging may be started again when the battery voltage is detected to be lower than a re-charging voltage threshold 122.

In the stages of constant-current charging and constant-voltage charging, input voltage of the electronic device generally is a fixed value (e.g., from a power supply plugged into the wall). Thus, the above described adjustment of charging voltage may be performed by a power management module of the electronic device itself.

Figure 2:
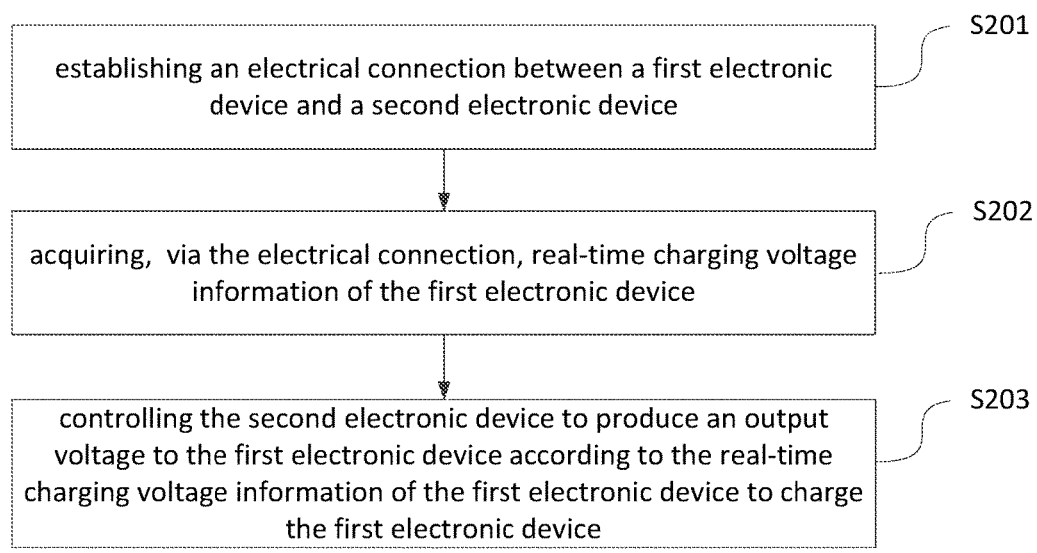
FIG. 2 is a flow diagram illustrating a method for power charging according to an exemplary embodiment.

FIG. 2 is a flow diagram illustrating a method for power charging according to an exemplary embodiment. In step S201, an electrical connection of a first electronic device is established with a second electronic device. The electrical connection provides communication path for both charging data and charging current. In step S202, the second electronic device acquires, via the electric connection, real-time charging voltage information of the first electronic device, wherein the real-time charging voltage information varies with charge state of the first electronic device. Charge state of a battery represents the level of charge at a particular moment. Each charge state corresponds to a particular amount of charge stored in the battery and may corresponds to a battery voltage or effective internal resistance of the battery. As the battery ages, the relationship between capacity (maximum charge stored), battery voltage, the effective internal resistance at a particular charge state may evolve. A battery controller typically keeps track of this relationship through cycles of charge and discharge of the battery. Herein, adjusting, monitoring, detecting, acquiring or reading a parameter in "real-time" refers to continuous or frequent access to the parameter as the parameter changes over time and if not continuous, frequency of access is relatively fast compared to the speed of change of the parameter.

In step S203, the second electronic device, while charging the first electronic device, control its output voltage supplied to the first electronic device according to the real-time charging voltage information of the first electronic device.

The establishment of the electrical connection between the first electronic device and the second electronic device may be based on establishing the electrical connection by using designated electrical interfaces on the first and the second electronic devices and a designated type of data line between the first electronic device and the second electronic device. A real-time charging voltage information of the first electronic device may be communicated via the data line in analogue or digital forms. The charging voltage information varies with the charge state of the corresponding battery through the various stages of charging.

In the embodiment above, both the first electronic device and the second electronic device may be mobile terminals (mobile phones or tablets, or laptop computers, for example), or the first electronic device may be a mobile terminal and the second electronic device may be a mobile power supply device. A mobile power supply device may be a smart charger, a smart battery pack, or a smart power bank. Other combinations are contemplated.

Figure 3:
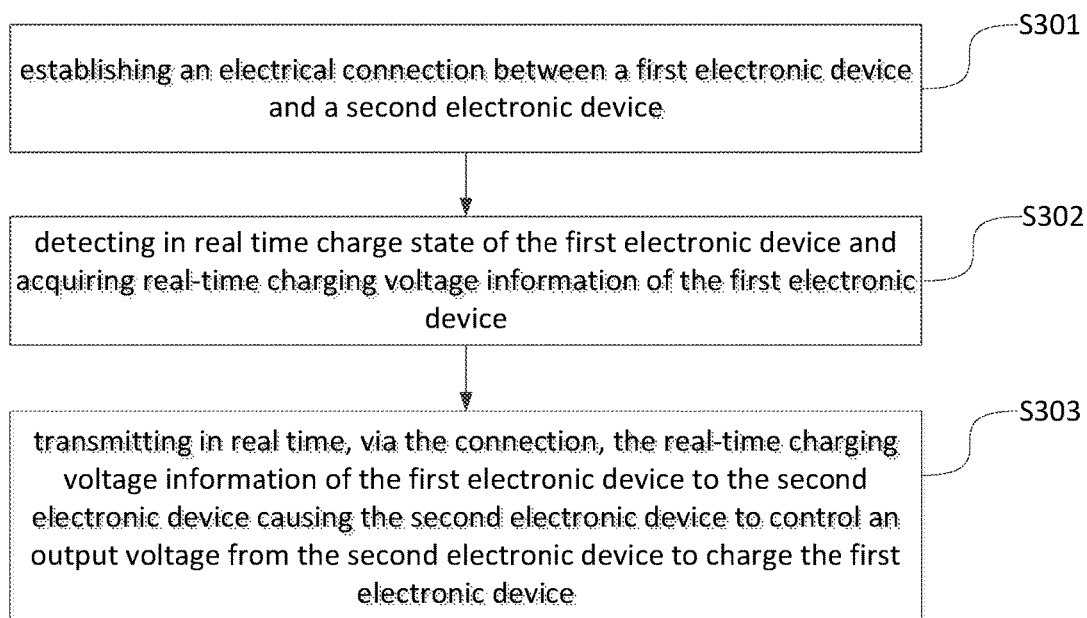
FIG. 3 is a flow diagram illustrating another method for power charging according to an exemplary embodiment.

FIG. 3 is a flow diagram illustrating another method for power charging according to an exemplary embodiment. In step S301, an electrical connection of a first electronic device is established with a second electronic device. The connection may be established through designated electrical interfaces on both devices and via designated data lines.

In step S302, charge state of the first electronic device is detected in real-time and real-time charging voltage information of the first electronic device is acquired by the first electronic device while the first electronic device is being charged by the second electronic device. The real-time charging voltage information varies with the charge state of the first electronic device, as the charging progresses through the various charging stages. When the charge state indicates that a present battery voltage value for the first electronic device is smaller than a preset voltage value (corresponding to 116 of FIG. 1), indicating that the battery of the first electronic device is to be charged in trickle charging stage or constant current charging stage, acquiring the real-time charging voltage of the first electronic device in step S302 may be alternatively accomplished by acquiring a present effective internal resistance of the battery in the first electronic device multiplied by a preset charging current value (e.g., 0.1 C for trickle charging stage), and 0.2 C-1.0 C for constant current charging stage). The effective internal resistance of the battery varies with the charge state of the first electronic device and thus is acquired in real-time manner. When the charge state indicates that a present battery voltage value for the first electronic device is equal to or larger than the preset voltage value (116 of FIG. 1), then the preset voltage value is acquired as the real-time charged voltage for the first electronic device in a constant-voltage charging stage.

In step S303, the real-time charging voltage information of the first electronic device is communicated or transmitted to the second electronic device in real-time via the electrical connection, causing the second electronic device to control and adjust its output voltage to charge the first electronic device according to the real-time charging voltage information of the first electronic device.

Figure 4A:
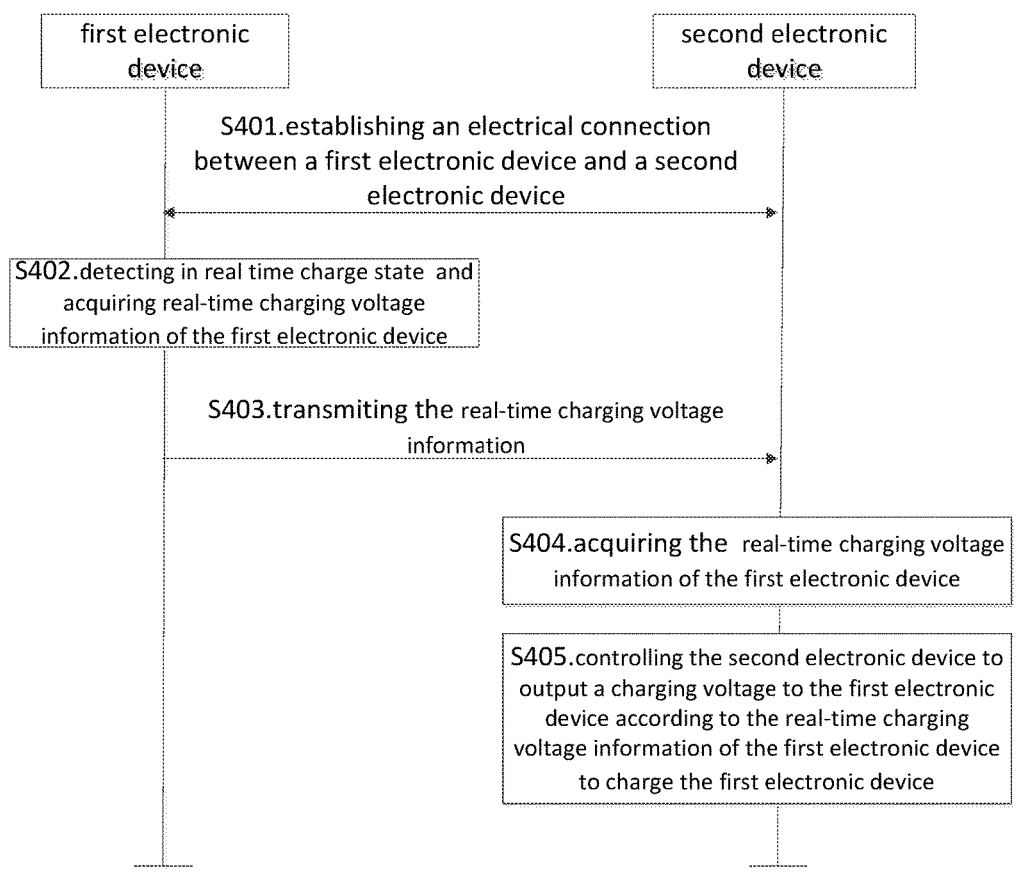
FIG. 4A is a flow diagram illustrating interaction of two electronic devices involved in power charging according to an exemplary embodiment.

FIG. 4A is a schematic diagram illustrating interaction of two devices involved in the method for power charging according to an exemplary embodiment. In step S401, an electrical connection of a first electronic device is established with a second electronic device. Both the first electronic device and the second electronic device are provided with a battery. In one exemplary implementation, the first electronic device is to be charged and the second electronic device charges the first electronic device. The first electronic device and the second electronic device may be the same type of electronic devices or may be different types of electronic devices. For example, both the first electronic device and the second electronic device may be mobile phones, or the first electronic device may be a mobile phone and the second electronic device may be a tablet computer, or the first electronic device may be a mobile phone and the second electronic device may be a mobile charger. Other combinations are contemplated.

The establishment of the electrical connection between the first electronic device and the second electronic device may be based on establishing the electrical connection by using designated electrical interfaces on the first and second electronic devices and a designated type of data line between the first electronic device and the second electronic device. The established connection may include data connection and power connection. In one embodiment, the designated interfaces may be USB Type C (Universal Serial Bus Type C) interfaces, and the designated data line may be a USB Type C data line. The USB Type C interfaces and data line are based on four-wire connection wherein two of four wires are used for serial data channel and data connection, and the other two wires are used as power lines for establishing power connection and supplying power. The connection established with USB Type C interfaces and data line has a symmetry characteristic allowing the first electronic device and the second electronic device to charge and to be charged in either direction. For example, in the embodiments described herein, the first electronic device is a device to be charged and the second device is used for charging the first electronic device. A reverse embodiment where the second electronic device is charged and the first device charges functions under similar principles.

In step S402, the first electronic device detects in real-time charge state of the first electronic device and acquires real-time charging voltage information of the first electronic device. After establishment of the connection, a charging of the first electronic device by the second electronic device begins. During charging, the first electronic device detects in real-time its own charge state through a power management module therein. The charge state information includes battery voltage of the first electronic device. The detection in real-time of charge state of the first electronic device may specifically include reading in real-time the battery voltage of the first electronic device. According to the charge state, real-time charging voltage information for the first electronic device may be determined and acquired. The charging voltage information is acquired in real-real time because it may vary as the charge state of the first electronic device changes.

During constant-current charging stage, the first electronic device is charged with constant-current when the charge state indicates that a present battery voltage value of the first electronic device is smaller than a preset maximum or final voltage value (e.g., 116 of FIG. 1). The constant charging current may be set at a preset current value (118 of FIG. 1). For example, the preset current may be set as a value between 0.1 C to 1.1 C. During constant-current charging stage, the effective internal resistance of the battery increases as the battery is charged. Correspondingly, the charging voltage needed by the first electronic device increases in order to ensure constant-current charging. Specifically, the required charging voltage is the preset current value multiplied by the effective internal resistance value of the battery. Thus the first electronic device may acquire the real-time charging voltage information by acquiring the real-time effective internal resistance of its battery multiplied by the preset constant charging current value.

When the charge state indicates that the present battery voltage of the first electronic device is equal to or greater than a preset maximum or final voltage value (116 of FIG. 1), the first electronic device enters the constant-voltage charging stage. During the constant-voltage charging stage, the charging voltage is maintained at constant voltage (e.g., 116 of FIG. 1). The constant charging voltage may be preset according to actual requirements. For example, the preset voltage value may be set as a value between 2.9V to 4.3V. During this stage, the step S402 of acquiring real-time charging voltage information may comprise acquiring the preset voltage value as the real-time charging voltage information.

In step S403, the real-time charging voltage information of the first electronic device is transmitted or communicated in real-time to the second electronic device. The transmission or communication may be in an isochronous transmission mode through the data connection provided in step S401 with the USB Type C interfaces and data line. It should be noted that the manner for transmitting or communicating the real-time charging voltage information may include periodic transmission of data blocks and any other modes not limited by this disclosure.

In step S404, the second electronic device acquires the real-time charging voltage information of the first electronic device via the electrical connection. The charging voltage information is acquired in real-time because charging voltage information varies with the charge state of the first electronic device.

In step S405, the second electronic device adjusts and controls, according to the acquired real-time charging voltage information of the first electronic device, an output voltage from the second electronic device to charge the first electronic device via the electrical connection. The second device may use a power management module to convert in real-time its own battery voltage to match the charging voltage required by the first electronic device, and output the converted voltage to the first electronic device for charging via the electric connection.

For example, after acquiring the real-time charging voltage information of the first electronic device, the second electronic device converts its own present battery voltage to the charging voltage through its own power management module. For example, in the case where the present battery voltage of the second electronic device is 3V, if the charging voltage information indicates that the first electronic device currently requires a charging voltage of 3.3V, the second electronic device converts the voltage of 3V to 3.3V through its own power management module and uses the voltage of 3.3V as output charging voltage. The second electronic device then outputs the charging voltage to the first electronic device based on the power connection established in step S401 with USB Type C interfaces and the four-wire data line.

Figure 4B:
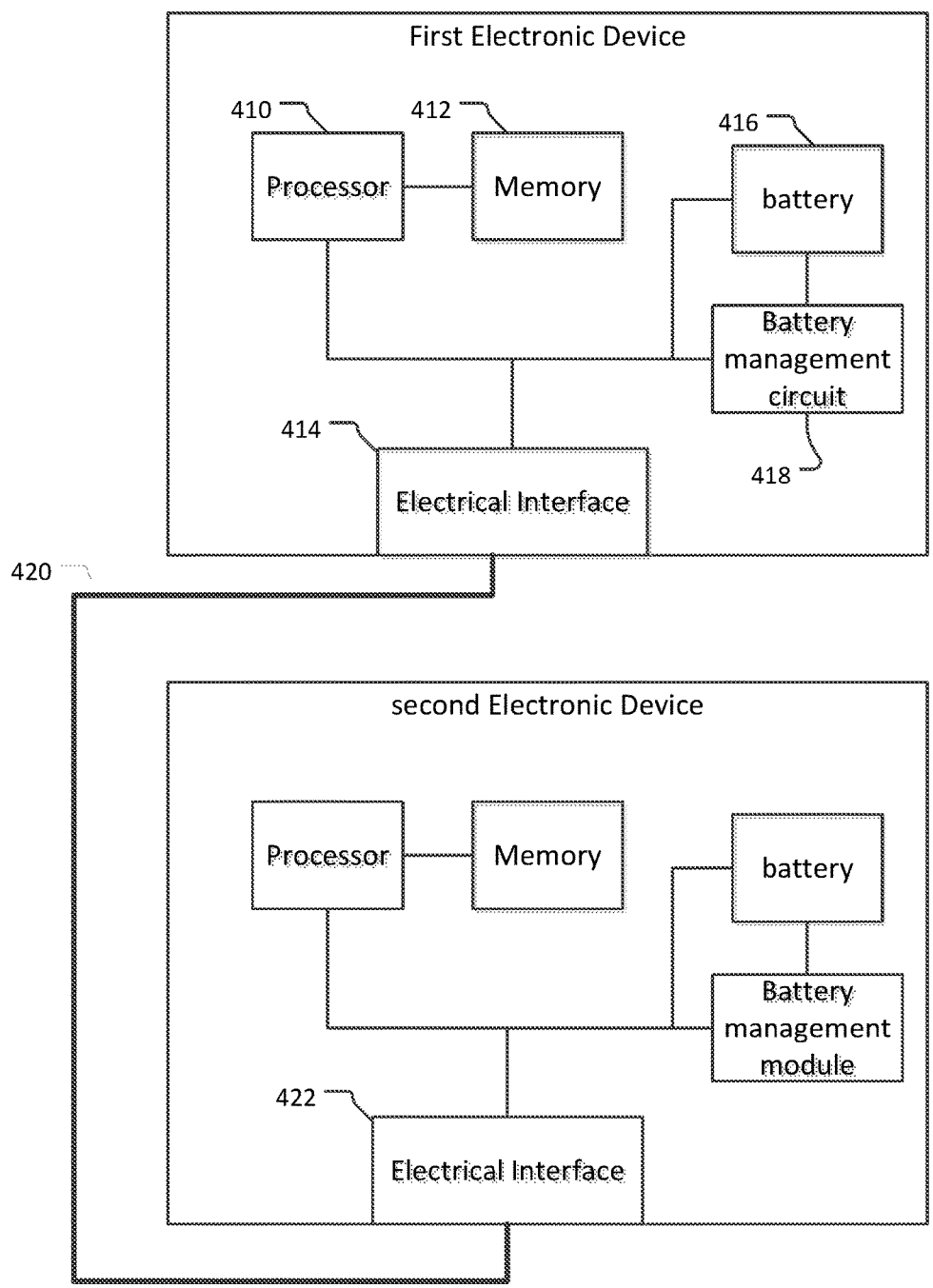
FIG. 4B is a block diagram showing electrical connectivity between two electronic devices involved in power charging according to an exemplary embodiment.

Thus, in the embodiment of FIG. 4A, an electrical connection between a first electronic device and a second electronic device is established. Real-time charging voltage information of the first electronic device is acquired by the second electronic device via the electrical connection, wherein the real-time charging voltage information varying with charge state of the first electronic device. An output voltage for charging the first electronic device is produced, controlled and adjusted by the second electronic device according to the real-time charging voltage information of the first electronic device. In such a way, merely one voltage conversion in the second electronic device during charging of the first device may be needed. This embodiment thus avoids having to make two voltage conversions, one by the first electronic device and the other by the second electronic device. Because power loss accompany each power conversion, the above embodiment helps improve electric efficiency in addition to reducing complexity of the power management modules for the electronic devices FIG. 4B illustrates exemplary connectivity for various components of the first and second electronic devices. The components of the first and second devices may be similar. For example, the first device comprises a processor 410, a memory 412, an electrical interface 414, a battery 416 and a battery management circuit 418. The processor is connected to all other components for controlling the operations of first electronic device. The battery management circuit 418 controls the charging and discharging of the battery 416. Both the battery and battery circuit are electrically connected to the electrical interface 414, such as a USB interface. The second electronic device is similar. The two electronic devices are connected by data line 420 via the electrical interface 414 and 422.

In the embodiments above, both the first electronic device and the second electronic device may be mobile terminals (mobile phones or tablets, or laptop computers, for example), or the first electronic device may be a mobile terminal and the second electronic device may be a mobile power supply device. A mobile power supply device may be a smart charger, a smart battery pack, or a smart power bank. Other combinations are contemplated. A processor 410 or memory 412 may be optional components for a mobile power supply device.

In the embodiments above, both the first electronic device and the second electronic device may be mobile terminals (mobile phones or tablets, or laptop computers, for example), or the first electronic device may be a mobile terminal and the second electronic device may be a mobile power supply device. A mobile power supply device may be a smart charger, a smart battery pack, or a smart power bank. Other combinations are contemplated. A processor 410 or memory 412 may be optional components for a mobile power supply device.

Figure 5:
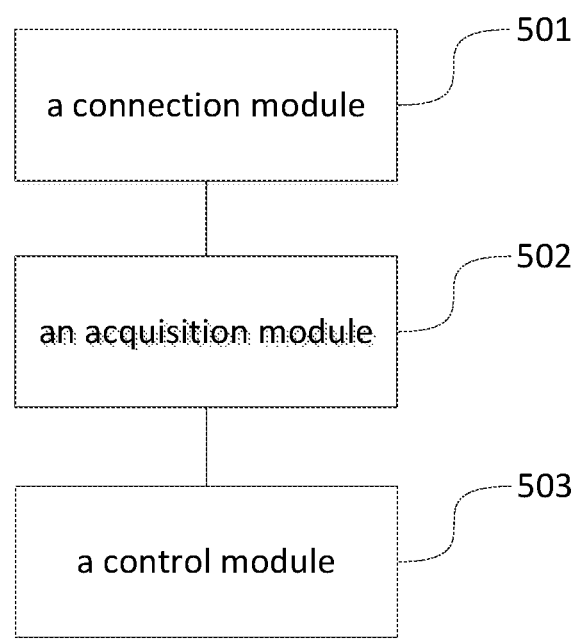
FIG. 5 is a block diagram illustrating a device for power charging according to another exemplary embodiment.

FIG. 5 is a block diagram illustrating a device for power charging according to another exemplary embodiment. By referring to FIG. 5, the device may include a connection module 501, an acquisition module 502 and a control module 503. The connection module 501 is configured to establish an electrical connection between a first electronic device and a second electronic device. The acquisition module 502 is configured to acquire, based on the connection, real-time charging voltage information of the first electronic device, wherein the real-time charging voltage information varies with charge state of the first electronic device. The control module 503 is configured to control, during charging the first electronic device, the second device to produce an output voltage to the first electronic device according to the real-time charging voltage information of the first electronic device to charge the first electronic device.

In the device above, the connection module is further configured to establish the electrical connection between the first electronic device and the second electronic device by using designated electrical interfaces on the first electronic device and the second electronic device and a designated type of data line between the first electronic device and the second electronic device.

Figure 6:
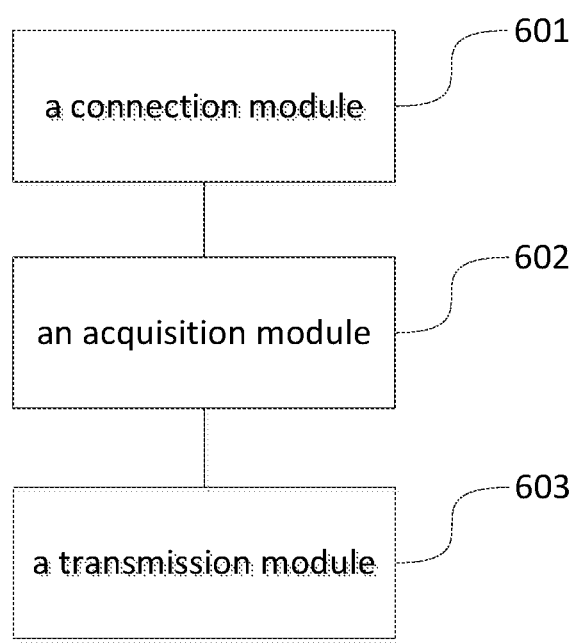
FIG. 6 is a block diagram illustrating a device for power charging according to an exemplary embodiment.

FIG. 6 is a block diagram illustrating a device for power charging according to another exemplary embodiment. By referring to FIG. 6, the device may include a connection module 601, an acquisition module 602 and a transmission module 603. The connection module 601 is configured to establish an electrical connection between a first electronic device and a second electronic device. The acquisition module 602 is configured to detect in real-time charge state of the first electronic device and acquire real-time charging voltage information of the first electronic device while the first electronic device being charged by the second electronic device, wherein the real-time charging voltage information varies with the charge state of the first electronic device. The transmission module 603 is configured to transmit or communicate in real-time and via the electrical connection, the real-time charging voltage information of the first electronic device to the second electronic device causing the second electronic device to adjust and control an output voltage from the second electronic device for charging the first electronic device via the electrical connection.

In one implementation, the connection module of FIG. 6 is further configured to establish the connection between the first electronic device and the second electronic device by using designated electrical interfaces on the first electronic device and the second electronic device and a designated type of data line between the first electronic device and the second electronic device.

In one implementation, the acquisition module of FIG. 6 is further configured to acquire a preset current value multiplied by a real-time effective internal resistance of a battery of the first electronic device as the real-time charging voltage information of the first electronic device when the charge state indicates that a present voltage value of the battery is smaller than a preset voltage value. The acquisition module is further configured to acquire the preset voltage value as the real-time charging voltage information of the first electronic device when the charge state indicates that a present voltage value of the battery equals to or is greater than the preset voltage value.

Figure 7:
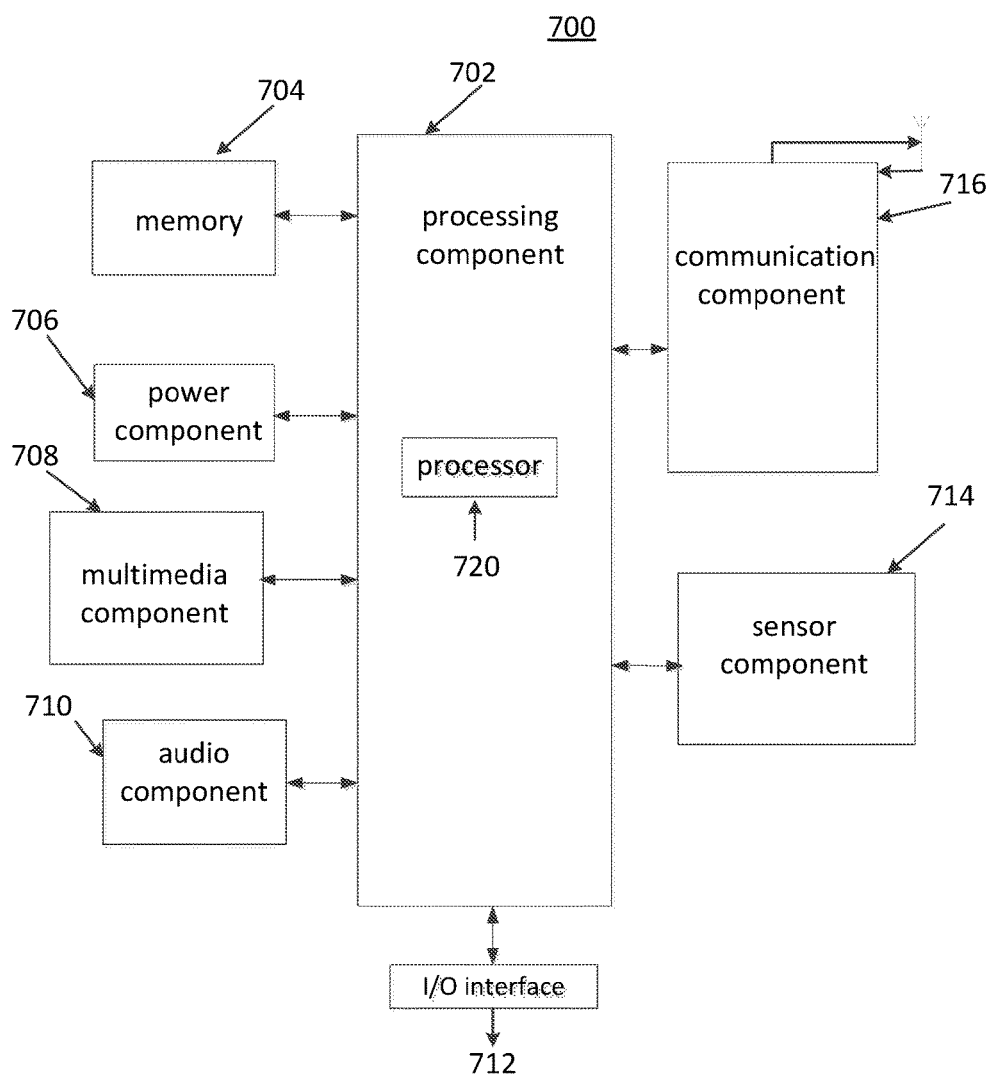
FIG. 7 is a block diagram illustrating an electronic device according to an exemplary embodiment.

Thus, in the embodiment of FIG. 4, an electrical connection between a first electronic device and a second electronic device is established. Real-time charging voltage information of the first electronic device is acquired by the second electronic device via the electrical connection, wherein the real-time charging voltage information varying with charge state of the first electronic device. An output voltage for charging the first electronic device is produced, controlled and adjusted by the second electronic device according to the real-time charging voltage information of the first electronic device. In such a way, merely one voltage conversion in the second electronic device during charging of the first device may be needed. This embodiment thus avoids having to make two voltage conversions, one by the first electronic device and the other by the second electronic device. Because power loss accompany each power conversion, the above embodiment helps improve electric efficiency in addition to reducing complexity of the power management modules for the electronic devices FIG. 7 is a block diagram illustrating an electronic device 700 according to an exemplary embodiment. For example, the device 700 may be a mobile phone, a computer, a digital broadcast terminal, a messaging device, a gaming console, a tablet, a medical device, an exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power for the device 700.

The multimedia component 708 includes a display screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia data while the device 700 is in an operation mode, such as a photographing mode or a video mode. Each of the front camera and the rear camera may be a fixed optical lens system or have optical focusing and zooming capability.

The audio component 710 is configured to output and/or input audio signals. For example, the audio component 710 may include a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, the peripheral interface modules being, for example, a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components (e.g., the display and the keypad, of the device 700), a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor or thermometer.

The communication component 716 is configured to facilitate communication, wired or wirelessly, between the device 700 and other devices. The device 700 can access a wireless network based on a communication standard, such as WiFi, 2G, 3G, LTE, or 4G cellular technologies, or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

In another exemplary embodiment of the disclosure, there also is provided a non-transitory computer readable storage medium having stored therein instructions that, when executed by one or more processors of a terminal, cause the terminal to perform a method for power charging as described above.

Each module or unit discussed above for FIG. 5-6, such as the connection module, the acquisition module, the control module, and the transmission module may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The embodiments above thus allows for direct charging of battery of the first device by the power circuit and battery of the second device. In some other embodiment, Battery and the power circuit of the second device may be uses to alternatively power the processor of the first device rather than through the battery and power circuit of the first device. In such a way, the first device may be powered directly by the second device.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for power charging, comprising:
   establishing an electrical connection between a first electronic device and a second electronic device;
   acquiring, by the second electronic device via the electrical connection, real-time charging voltage information of a battery in the first electronic device, wherein the real-time charging voltage information varies with a charge state of the battery in the first electronic device; and
   controlling by the second electronic device, during charging of the battery in the first electronic device by the second electronic device, an output voltage of the second electronic device to charge the battery of the first electronic device according to the real-time charging voltage information,
   wherein the real-time charging voltage information for the first electronic device is a real-time internal resistance of the battery in the first electronic device multiplied by a preset current value when the charge state indicates that a present voltage of the battery is smaller than a preset voltage value, wherein an effective internal resistance of the battery varies with the charge state of the battery in the first electronic device; and
   the real-time charging voltage information of the battery in the first electronic device is the preset voltage value when the charge state indicates that the present voltage of the battery in the first electronic device is equal to or greater than the preset voltage value.

2. The method of claim 1, wherein establishing the electrical connection between the first electronic device and the second electronic device comprises:
   establishing the electrical connection between the first electronic device and the second electronic device using designated electrical interfaces on the first electronic device and the second electronic device and a designated type of data line between the first electronic device and the second electronic device.

3. The method of claim 1, wherein each of the first electronic device and the second electronic device comprises one of a mobile terminal or a mobile power supply device.

4. A method for power charging, comprising:
   establishing an electrical connection between a first electronic device and a second electronic device;
   detecting by the first electronic device in real-time a charge state of a battery in the first electronic device and determining by the first electronic device real-time charging voltage information of the battery in the first electronic device while the first electronic device is being charged by the second electronic device, wherein the real-time charging voltage information varies with the charge state of the battery in the first electronic device; and
   communicating in real-time via the electrical connection the real-time charging voltage information of the battery in the first electronic device to the second electronic device, causing the second electronic device to control an output voltage delivered from the second electronic device to charge the battery in the first electronic device via the electrical connection,
   wherein detecting by the first electronic device in real-time the charge state of the battery in the first electronic device and determining by the first electronic device the real-time charging voltage information of the battery in first electronic device comprises:
   acquiring by the first electronic device a real-time effective internal resistance of the battery in the first electronic device;
   determining as the real-time charging voltage information for the first electronic device a real-time internal resistance of the battery in the first electronic device multiplied by a preset current value when the charge state indicates that a present voltage of the battery is smaller than a preset voltage value, wherein an effective internal resistance of the battery varies with the charge state of the battery in the first electronic device; and
   determining the preset voltage value as the real-time charging voltage information of the battery in the first electronic device when the charge state indicates that the present voltage of the battery in the first electronic device is equal to or greater than the preset voltage value.

5. The method of claim 4, wherein establishing the electrical connection between the first electronic device and the second electronic device comprises:
   establishing the electrical connection between the first electronic device and the second electronic device using designated electrical interfaces on the first electronic device and the second electronic device and a designated type of data line between the first electronic device and the second electronic device.

6. An electronic apparatus, comprising:
   a processor;
   a memory for storing instructions executable by the processor; and
   an electrical interface,
   wherein the processor is configured to:
       establish an electrical connection with a first electronic device via the electrical interface;
       acquire via the electrical connection real-time charging voltage information of a battery in the first electronic device, wherein the real-time charging voltage information varies with a charge state of the battery in the first electronic device; and
       control, during charging of the battery of the first electronic device, the electronic apparatus to produce an output voltage to charge the battery of the first electronic device according to the real-time charging voltage information,
   wherein the real-time charging voltage information for the first electronic device is a real-time internal resistance of the battery in the first electronic device multiplied by a preset current value when the charge state indicates that a present voltage of the battery is smaller than a preset voltage value, wherein an effective internal resistance of the battery varies with the charge state of the battery in the first electronic device; and
   the real-time charging voltage information of the battery in the first electronic device is the preset voltage value when the charge state indicates that the present voltage of the battery in the first electronic device is equal to or greater than the preset voltage value.

7. The electronic apparatus of claim 6, wherein the processor is further configured to establish the electrical connection between the first electronic device and the electronic apparatus using the electrical interface and a designated electrical interface in the first electronic device and a designated type of data line between the electronic apparatus and the first electronic device.

8. The electronic apparatus of claim 6, each of the first electronic device and the electronic apparatus comprises one of a mobile terminal or a mobile power supply device.

9. A first electronic device, comprising:
- a processor;
- a memory for storing instructions executable by the processor;
- an electrical interface; and
- a battery connected to the electrical interface and the processor, wherein the processor is configured to:
- establish an electrical connection with a second electronic device via the electrical interface;
- detect in real-time charge state of the battery and determine real-time charging voltage information of the battery while being charged by the second electronic device via the electrical connection, wherein the real-time charging voltage information varies with the charge state of the battery; and
- communicate in real-time via the electrical connection the real-time charging voltage information of the battery to the second electronic device, causing the second electronic device to control an output voltage delivered from the second electronic device to charge the battery, wherein the processor is further configured to:
- acquire a real-time effective internal resistance of the battery;
- determine as the real-time charging voltage information for the battery a real-time internal resistance of the battery multiplied by a preset current value when the charge state indicates that a present voltage value of the battery is smaller than a preset voltage value, wherein an effective internal resistance of the battery varies with the charge state of the battery; and
- determine the preset voltage value as the real-time charging voltage information of the battery when the charge state indicates that the present voltage value of the battery is equal to or greater than the a preset voltage value.

10. The first electronic device of claim 9, wherein the processor is further configured to establish the electrical connection between the electronic device and the second electronic device using the electrical interface and a designated electrical interface on the second electronic device and a designated type of data line between the first electronic device and the second electronic device.

* * * * *